US008225477B2

(12) United States Patent
Alexander

(10) Patent No.: US 8,225,477 B2
(45) Date of Patent: Jul. 24, 2012

(54) FAIRING REMOVAL TOOL

(75) Inventor: Phillip Alexander, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1137 days.

(21) Appl. No.: 12/075,673

(22) Filed: Mar. 13, 2008

(65) Prior Publication Data

US 2009/0229103 A1 Sep. 17, 2009

(51) Int. Cl.
*B23P 19/00* (2006.01)

(52) U.S. Cl. ............. 29/426.5; 29/270; 29/278; 254/21; 254/25; 254/28; 269/3; 269/6

(58) Field of Classification Search ................. 29/426.1, 29/426.5, 270, 278; 254/25, 28, 21
See application file for complete search history.

(56) References Cited

U.S. PATENT DOCUMENTS 1,665,760 A * 4/1928 Vaught ............................ 254/28
3,134,574 A 5/1964 Reuterfors
4,216,685 A * 8/1980 Taylor ............................ 81/3.55
5,695,172 A 12/1997 Hreha
7,051,390 B2 5/2006 van Beek
7,185,879 B1 3/2007 Lejuez
2008/0001129 A1 1/2008 Weaver et al.

OTHER PUBLICATIONS

Special Operation Tactical Supply—G.I. P-51 Can Opener—Mar. 5, 2006.*
ArmyNavyShopping.com copyright 2011.*
Modern Mechanix—Apr. 1924.*
County Comm Government Products Group—Dec. 3, 2005 ( wayback machine).*

* cited by examiner

*Primary Examiner* — Derris Banks
*Assistant Examiner* — Azm Parvez
(74) *Attorney, Agent, or Firm* — Kinney & Lange, P.A.

(57) ABSTRACT

A fairing removal tool and a method of using the tool provide for an improved method of removing a fairing from an engine inlet case. The fairing removal tool employs a hook and notch to engage the fairing and release the bonds joining the fairing to an inner structural element of the inlet case.

19 Claims, 5 Drawing Sheets

FAIRING REMOVAL TOOL

STATEMENT OF GOVERNMENT INTEREST

The U.S. Government has a paid-up license in this invention and the right in limited circumstances to require the patent owner to license others on reasonable terms as provided for by the terms of N00019-02-C-3003 awarded by the United States Navy.

BACKGROUND

Fairings are often present in the inlet case of aircraft turbofan engines. A fairing is generally bonded to and surrounds and protects an inner strut or other similar structural element within the inlet case. Each inner strut generally extends from a central inner ring to an outer diameter ring of the inlet. Each fairing typically surrounds the full radial length of the inner strut. Composite fairings typically consist of several layers of fiberglass or other materials, bonded together to form the fairing structure. Each fairing has a closed and generally rounded upstream end. From the upstream end, two fairing sides extend downstream and around the inner strut. The sides of the fairing are bonded to sides of the inner strut and continue downstream to form two downstream ends. Fairings and inner struts are generally located upstream of the compressor, combustion, and turbine sections of the turbofan. In some turbofans, the fairings contain sensors and heating elements to prevent the formation of ice within the inlet case and to de-ice areas of the inlet case.

During operation of the turbofan and during flight, a fairing or its heating elements may become damaged or inoperable. Damage to the fairing or the heating elements may occur due to events such as a bird strike. Inoperability may result because of wear or malfunction. When significant damage to a fairing or its heating elements occurs or the heating elements no longer function properly, the fairing is normally removed and replaced.

Removing a fairing from the inner strut to which it is bonded can be an arduous task for an aircraft mechanic or operator. In order to remove a fairing from an inner strut, the bond between the two components must be released. Typically, a silicone compound is used to bond the fairing and inner strut. The bondline between the fairing and inner strut typically extends the full length of the inner strut (along the turbofan's longitudinal axis) and roughly two-thirds the length of the fairing (along the same axis). This bondline generally extends the full radial length of the fairing and inner strut. Due to the relatively large surface area of the bond and the strength of the bond needed to ensure adequate binding during flight, releasing the bond can be quite difficult.

Until now, removing a fairing has been difficult. A large number of inner struts extend from the nosecone to the outer diameter ring, usually more than a dozen. This configuration of multiple inner struts and fairings, as well as components farther downstream, makes for small spaces within the inlet case and prevents the use of large tools. Typically, a screwdriver type prybar or a similar small tool was used to pry the fairing away from the inner strut. A utility knife or other small blade was then used to cut away at the bondline. This method of releasing the bond had several faults. First, screwdriver type prybars generally have a limited thickness and an operator would need to pry many times along the radial length of the fairing in order to release the fairing-strut bond. On occasion, an operator would need to pry multiple times in a small area to fully release even a portion of the bond. A typical operator might spend fifteen or more minutes using this method to remove a single fairing. Additionally, due to the time necessary to remove the fairing and the awkward angle at which the operator needed to use a prybar to pry apart the bond, fairing removal was performed only while the operator was on the ground. Second, an operator would have to reach a good distance beyond the downstream ends of the fairing in order to position the screwdriver type prybar to adequately pry. In some instances, this would require the additional removal of downstream components, such as the first set of compressor vanes, before a fairing could be removed. The downstream components would then need to be replaced once the fairing was removed. This increased the time needed to remove and replace a fairing. Third, damage to the inner strut would sometimes result from the use of a prybar to pry the fairing from the strut. When damage to the inner strut occurred, the inner strut would then need to be repaired or replaced.

Prior fairing removal methods and tools did not meet the needs of aircraft mechanics and operators. Thus, there is still a need for a faster and more efficient method of removing a fairing from an inlet case and still a need for a useful tool to facilitate such a method.

SUMMARY

The present invention provides a fairing removal tool and a method suitable for removing a fairing from an engine inlet case. In one disclosed embodiment, the fairing removal tool includes a handle, a shaft, and a head. The head includes a prying radius, a hook near an end of the head distal to the handle, and a notch located between the hook and the prying radius configured to engage a downstream end of a fairing. The method of removing a fairing entails engaging the hooked end of the fairing removal tool to an overhanging downstream end of a fairing and applying a force on the shaft or handle of the tool to pry the fairing away from the inner strut to which it is bonded. This process is repeated along the length of both downstream ends of the fairing until the bonds between the fairing and the inner strut are completely released and the fairing can be removed from the engine inlet case.

DETAILED DESCRIPTION

Figure 1:
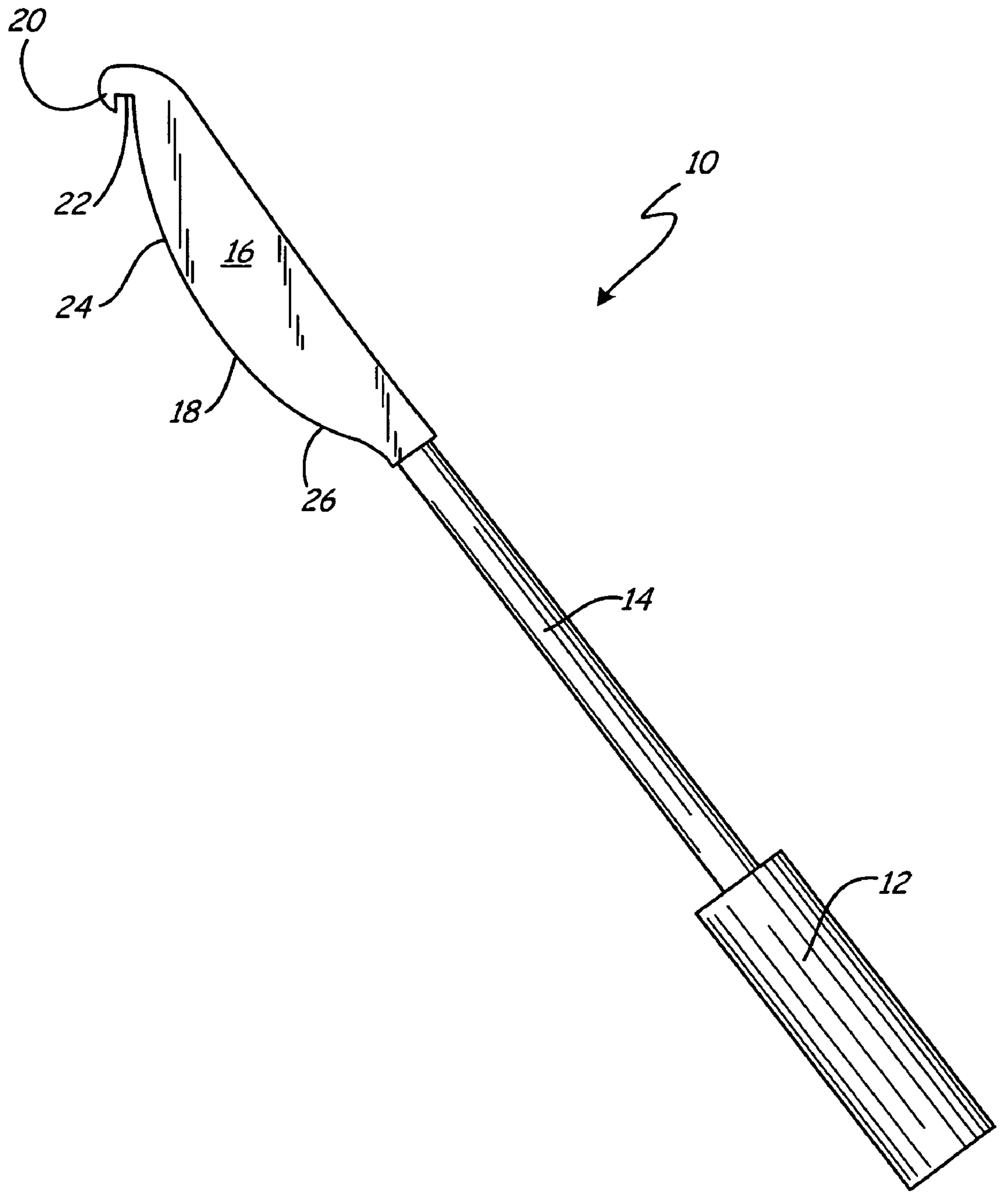
FIG. 1 is a side view of one embodiment of the fairing removal tool.
Figure 2:
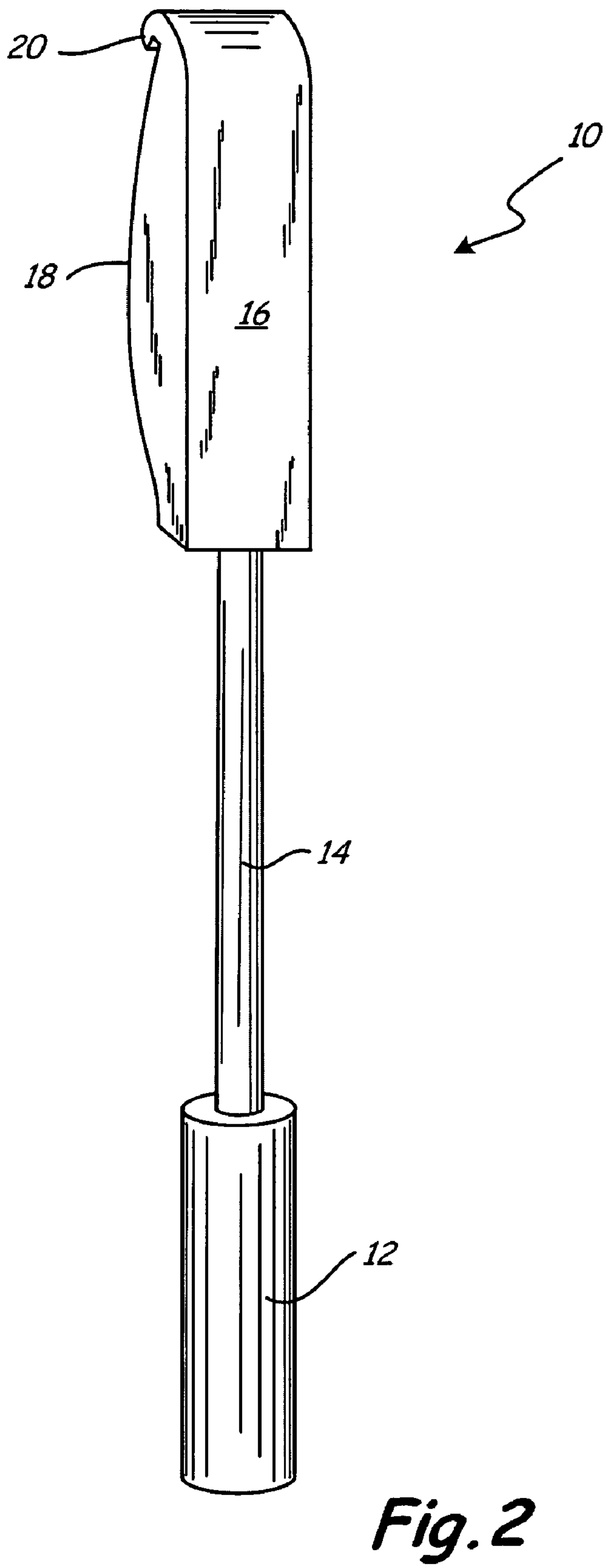
FIG. 2 is a top view of the fairing removal tool of FIG. 1.

Referring to the figures, an illustrative embodiment of a fairing removal tool according to the present invention is generally indicated by reference numeral 10. FIGS. 1 and 2 illustrate a side view and a top view of one embodiment of a fairing removal tool 10, respectively. The fairing removal tool 10 includes a handle 12, a shaft 14, and a head 16. The handle 12 allows an operator to easily grip the fairing removal tool. The handle 12 may be contoured to fit comfortably in an operator's hand. The handle 12 may also be shaped, textured, or covered with a non-slip material so that an operator may easily grip the handle securely with a minimum of slippage when the fairing removal tool is in use. The shaft 14 connects the handle 12 to the head 16.

The head 16 includes a prying radius 18. While the fairing removal tool 10 of FIGS. 1 and 2 has a generally curved convex prying radius 18, the fairing removal tool of the present invention is not limited to this configuration. The prying radius 18 may also have a flattened V-shape or other geometries suitable for providing a fulcrum or fulcrums necessary for effective prying.

The prying radius 18 may include an effective prying area 24 and a prying relief 26. The effective prying area 24 is the area of the head 16 that contacts the fairing as it is removed. Contact points along the effective prying area 24 act as fulcrums as the fairing is pried from an inner strut. A more detailed discussion of fairing removal is provided below. In an exemplary embodiment, the effective prying area 24 will have a length approximately equal to the length of the bond between the fairing and the attached inner strut. In such an embodiment, the entire or nearly the entire effective prying area 24 can be utilized as a fulcrum during release of the bond joining the fairing and inner strut. The prying relief 26 is the area of the fairing removal tool head that does not directly contact the fairing during fairing removal.

Figure 3:
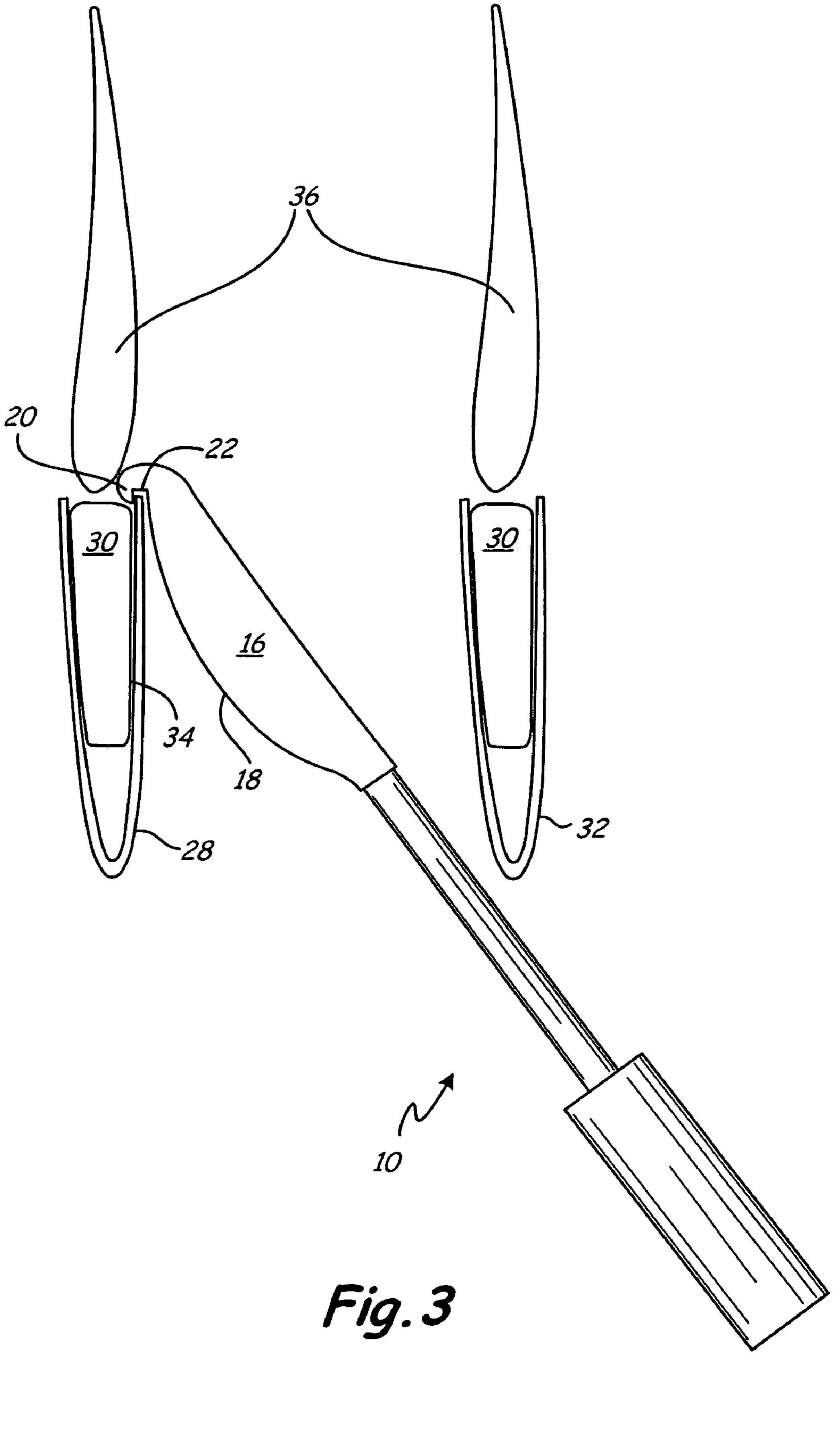
FIG. 3 is a cross section view of a fairing with a fairing removal tool engaged to a downstream end of the fairing.

The head 16 also includes a hook 20 near the end of the head 16 distal the handle 12 and a notch 22 located between the hook 20 and the prying radius 18. The hook 20 and notch 22 are configured to engage a downstream end of a fairing allowing an operator to pry and disengage the bond between the fairing and a joined inner strut, or a similar structure, bonded to the fairing. The hook 20 and notch 22 allow an operator to easily position the tool on a downstream end of a fairing. FIG. 3 illustrates a fairing removal tool 10 engaged to a downstream end of a fairing 28 that is bonded to an inner strut 30. The downstream end of the fairing is positioned within the notch 22 of the fairing removal tool during use.

As FIG. 3 illustrates, when the downstream end of the fairing 28 is engaged with the fairing removal tool 10, the inner side of the fairing abuts the hook 20 and the end and outer sides of the fairing are located within the notch 22. Ideally, the hook 20 and notch 22 are configured so that when the fairing removal tool 10 is engaged to a downstream end of a first fairing 28, an adjacent fairing 32 does not interfere with the shaft 14 and the handle 12 of the fairing removal tool as shown in FIG. 3. Thus, an operator may both position the fairing removal tool on the downstream end of the fairing and operate the tool without interference from adjacent fairings. This is accomplished most easily near the outer diameter ring where adjacent struts 30 and fairings 28, 32 are spaced apart farthest. Closer to the central inner ring, however, the struts and fairings are closer together. In an exemplary embodiment, the hook 20 and notch 22 are configured so that even near the central inner ring, an adjacent fairing 32 does not interfere with the shaft 14 and the handle 12 of the fairing removal tool when engaged to a fairing. Additionally, the hook 20 and notch 22 do not interfere with the first variable vanes 36.

Figure 4:
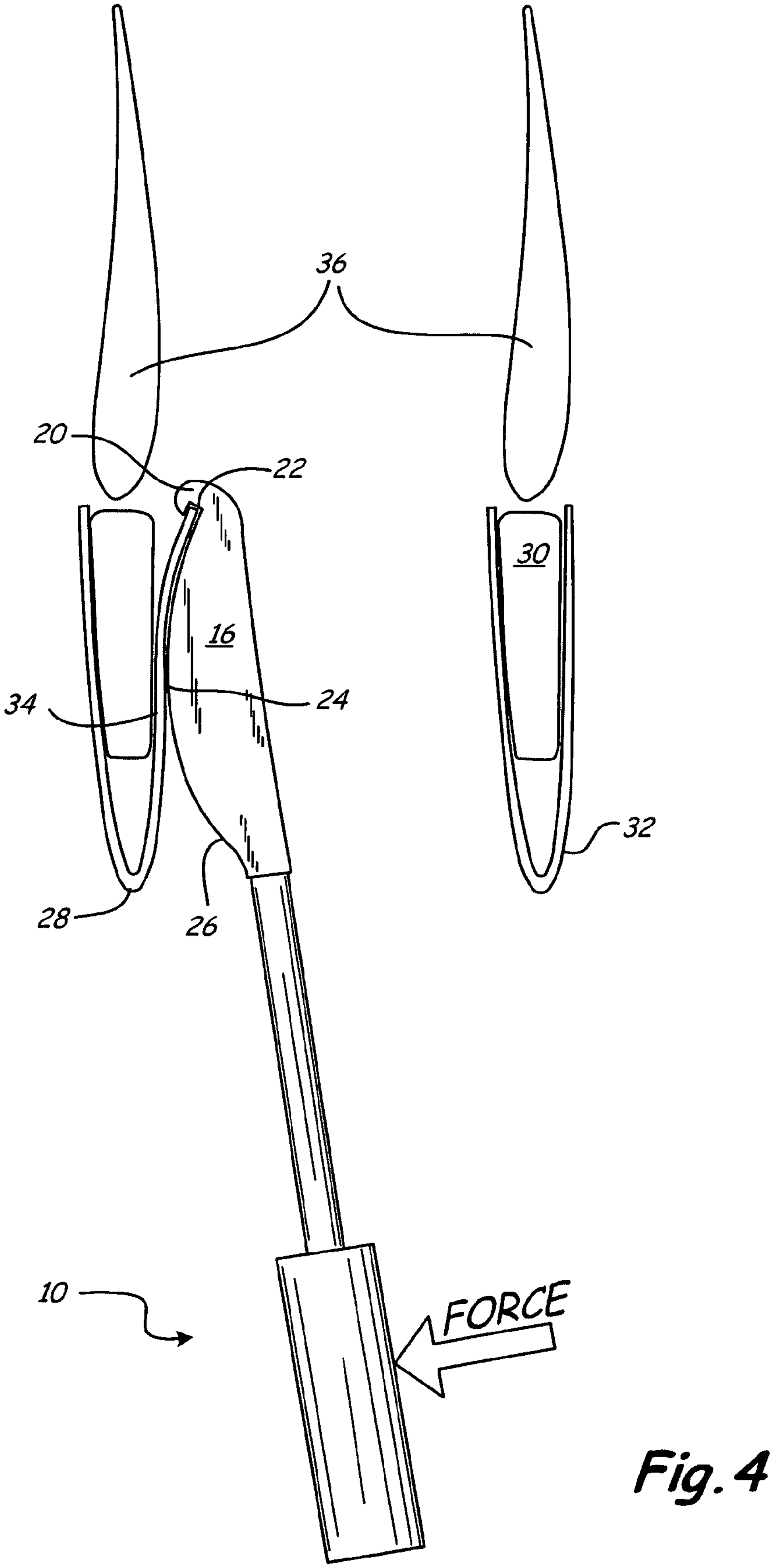
FIG. 4 is a cross section view of a fairing with a fairing removal tool engaged to a downstream end of the fairing after force has been applied to the fairing removal tool.

The fairing removal tool acts as a first class lever. Release of a bond 34 between a fairing 28 and an inner strut 30 is accomplished by first engaging a downstream end of the fairing 28 with the hook 20 and notch 22 of the fairing removal tool 10 as illustrated in FIG. 3 and described above. Once engaged, the operator applies force to the handle 12 or shaft 14 of the fairing removal tool 10 generally in a direction toward the longitudinal axis of the fairing 28 as shown in FIG. 4 to pry the fairing away from the inner strut. As force is applied to the handle 12 or shaft 14, the downstream end of the fairing 28 is pulled by the hook 20 away from the inner strut 30. During prying, the downstream end of the fairing is pulled along the prying radius 18. As the fairing is pulled, the bond 34 between the fairing 28 and inner strut 30 is released. In an exemplary embodiment, the length of the bond 34 is about equal to the length of the effective prying area 24 of the prying radius 18. The length of the bond 34 between the fairing 28 and inner strut 30 is typically between about 2 inches (5.1 cm) and about four inches (10.2 cm).

Figure 5:
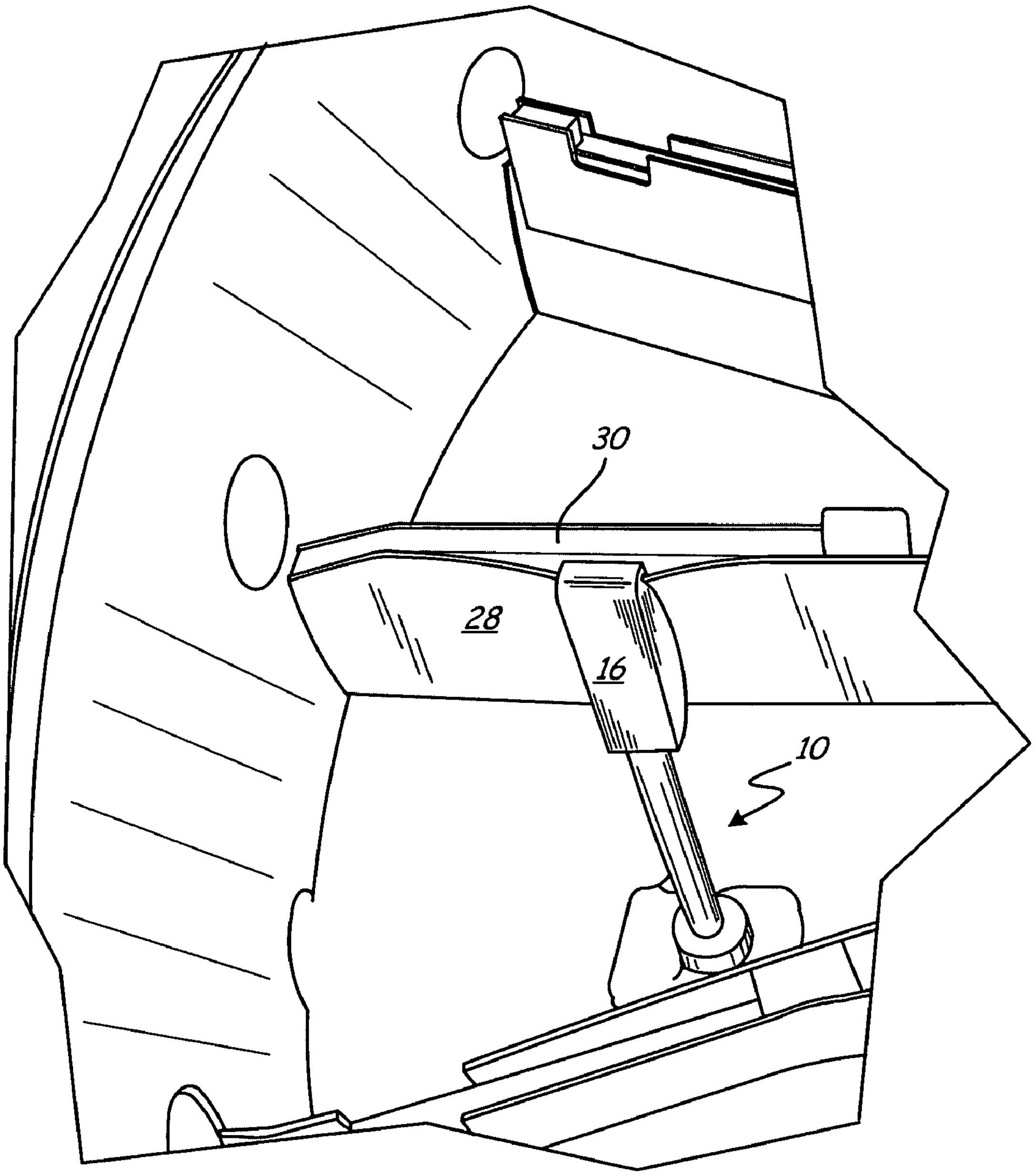
FIG. 5 is a view of the fairing removal tool engaging a fairing in an engine inlet.

FIG. 5 illustrates a view from an area of the engine inlet case downstream of the fairings where engagement of the fairing tool with a downstream end of a fairing has occurred and prying of the fairing has begun. The area of the fairing 28 engaged with fairing removal tool 10 has become separated from the inner strut 30. Areas of the fairing not directly engaged to the fairing removal tool but adjacent such areas have also separated from the inner strut, but to a lesser degree. Due to the typical strength of the bond 34 between a fairing 28 and an inner strut 30 and the lengths of the fairing and inner strut, one instance of prying may be insufficient to release the bond 34 over the entire length of the inner strut. In these instances, it is necessary to repry the fairing at a different location along the length of the fairing. Once the fairing has been pried at enough locations along its length, the bond 34 may be fully released.

A fairing 28 is typically bonded to an inner strut 30 along both downstream sides (FIGS. 3 and 4). Thus, bonds 34 along both sides of the inner strut 30 must be released before the fairing 28 can be completely removed. The process described above is performed on both sides of the fairing 28 until both bonds 34 are released. Once both bonds 34 are released, the operator may fully remove the fairing 28 from the inner strut 30 and the engine inlet case.

Dimensions of one exemplary embodiment of the fairing removal tool 10 are provided below. The description of this embodiment does not impose limitations on other possible configurations and dimensions of the fairing removal tool or its components, however. The overall length of one embodiment of the fairing removal tool is about eighteen inches (45.7 cm). The lengths of the handle, shaft, and head are about four inches (10.16 cm), ten inches (25.4 cm), and four inches (10.16 cm), respectively. The width of the head is about one inch (2.54 cm). The depth of the notch 22 is about 0.1 inches (0.254 cm) and the width of the notch 22 (the distance from the hook to the prying radius) is about 0.07 inches (0.178 cm). The angle of the notch 22 relative to the longitudinal axis of the fairing removal tool 10 is about thirty degrees. The width of the head may affect the number of pries necessary to release the bondline between a fairing and an inner strut. Thus, head widths between about 0.5 inches (1.27 cm) and about two inches (5.08 cm) may be suitable for smaller or larger engine inlet cases. The fairing removal tool and its components may be comprised of steel or any other materials strong enough to facilitate the fairing removal process.

The configurations of the fairing, inner strut, and the fairing removal tool allow an operator to work from the front of the engine inlet without the need for the operator to position his hand downstream of the fairing. The design of the fairing removal tool also allows fairing removal without the need for removing engine inlet components downstream of the fairing and inner strut, such as the first row of variable vanes. The design of the fairing removal tool further allows an operator to engage in fairing removal from the ground or while on the wing of the aircraft near the engine inlet.

Although the present invention has been described with reference to exemplary embodiments, workers skilled in the art will recognize that changes may be made in form and detail without departing from the spirit and scope of the invention.

The invention claimed is:

1. A fairing removal tool comprising:
 - a handle;
 - a head, wherein the head has a width between 0.5 inches (1.3 cm) and 2 inches (5.1 cm), the head comprising:
   - a first end distal to the handle;
   - a second end proximate to the handle;
   - a hook located near the first end of the head;
   - a notch located near the hook and the first end and configured for engagement with a downstream end of a fairing; and
 - a prying radius extending substantially from the notch to the second end; and
 - an elongated shaft extending between the handle and the head.

2. The tool of claim 1, wherein the prying radius comprises an effective prying edge and a prying relief.

3. The tool of claim 2, wherein the effective prying edge has a length between 2 inches (5.1 cm) and four inches (10.2 cm).

4. The tool of claim 1, wherein the hook and the notch are arranged so that the shaft and the handle of the tool do not contact an upstream end of a second fairing during engagement of the tool with a downstream end of a first fairing.

5. The tool of claim 1, wherein the hook and the notch are arranged to allow fairing removal by an operator positioned at an upstream end of the fairing.

6. A fairing removal tool comprising:
 - a handle;
 - an elongated shaft extending from the handle; and
 - a head comprising:
   - a first end distal to the shaft;
   - a second end connected to the shaft;
   - a hook located near the first end of the head; and
   - a notch located near the hook and the first end and configured for engagement with a downstream end of a fairing, wherein an axis of the notch forms an angle of approximately 30° relative to a longitudinal axis of the shaft; and
   - a prying radius extending from the notch towards the second end, wherein the prying radius substantially extends from the first end to the second end.

7. The tool of claim 1, wherein the hook, the notch, and the prying radius are arranged so that engagement of the tool to a downstream end of a fairing to be removed coupled with application of a force applied on the handle or shaft will release a bond between the fairing and an inner strut.

8. A method for removing a fairing from an inner strut of an engine inlet using a fairing removal tool with a handle, an elongated shaft and a head having a hook located distally from the handle, a notch located near the hook and a prying radius extending substantially from the notch to an end of the head proximate the shaft, the method comprising:
 - inserting the fairing removal tool into the engine inlet from a front side of the engine inlet;
 - engaging the hook and notch of the fairing removal tool at a first location on a first overhanging downstream end of the fairing;
 - applying a force on the shaft or handle of the fairing removal tool in a direction towards the fairing so that force is applied to the fairing by the hook and the prying radius of the head of the fairing removal tool;
 - reengaging the hook and notch of the fairing removal tool at additional locations on the first overhanging downstream end of the fairing and applying a force on the shaft or handle of the fairing removal tool in a direction towards the fairing at each additional location until a first bond between the fairing and the inner strut is released;
 - engaging the hook and notch of the fairing removal tool at a first location on a second overhanging downstream end of the fairing;
 - applying a force on the shaft or handle of the fairing removal tool in a direction towards the fairing so that force is applied to the fairing by the hook and the prying radius of the head of the fairing removal tool;
 - reengaging the hook and notch of the fairing removal tool at additional locations on the second overhanging downstream end of the fairing and applying a force on the shaft or handle of the fairing removal tool in a direction towards the fairing at each additional location until a second bond between the fairing and the inner strut is released; and
 - removing the fairing from engagement with the inner strut.

9. The method of claim 8, wherein the prying radius of the fairing removal tool comprises an effective prying edge and a prying relief.

10. The method of claim 9, wherein the effective prying edge has a length approximately equal to a length of a bond between a fairing to be removed and an inner strut attached to the fairing.

11. The method of claim 8, wherein the hook and the notch of the fairing removal tool are arranged so that the shaft and the handle of the tool do not contact an upstream end of a second fairing during engagement of the tool with a downstream end of a first fairing or during application of force on the shaft or handle.

12. The method of claim 8, wherein engaging the hooked end of a fairing removal tool at a first location on a first overhanging downstream end of the fairing and applying a force on a shaft or handle of the fairing removal tool in a direction towards the fairing is performed by an operator positioned at an upstream end of the fairing.

13. The method of claim 8, wherein the head of the fairing removal tool has a width between 0.5 inches (1.3 cm) and 2 inches (5.1 cm).

14. The tool of claim 1, wherein the prying radius is convex.

15. The tool of claim 1, wherein the notch has a depth of 0.1 inches (0.25 cm) and a width of 0.07 inches (0.18 cm).

16. The tool of claim 1, wherein the head has a length of 4 inches (10.2 cm).

17. The tool of claim 6, wherein the prying radius is convex.

18. The tool of claim 6, wherein the notch has a depth of 0.1 inches (0.25 cm) and a width of 0.07 inches (0.18 cm).

19. The tool of claim 6, wherein the head has a length of 4 inches (10.2 cm).

* * * * *